US008882877B2

(12) United States Patent
Tang et al.

(10) Patent No.: US 8,882,877 B2
(45) Date of Patent: Nov. 11, 2014

(54) BORON-CONTAINING SYNERGISTIC UREA AND PREPARATION METHOD AND APPLICATION THEREOF

(71) Applicant: Beijing J-Tec Technology Co., Ltd, Beijing (CN)

(72) Inventors: Chenghan Tang, Beijing (CN); Anxing Wei, Beijing (CN); Yunjian Zhao, Beijing (CN)

(73) Assignee: Beijing J-Tec Technology Co., Ltd., Beijing (CN)

( * ) Notice: Subject to any disclaimer, the term of this patent is extended or adjusted under 35 U.S.C. 154(b) by 122 days.

(21) Appl. No.: 13/716,070

(22) Filed: Dec. 14, 2012

(65) Prior Publication Data
US 2014/0007633 A1    Jan. 9, 2014

(30) Foreign Application Priority Data

Jul. 5, 2012 (CN) .............................. 201210232891

(51) Int. Cl.
*C05D 9/02*     (2006.01)
*C05C 9/00*     (2006.01)

(52) U.S. Cl.
CPC ...................................... *C05C 9/00* (2013.01)
USPC ............................ 71/28; 71/27; 71/29; 71/30

(58) Field of Classification Search
CPC ...................................................... C05C 9/00
USPC ...................................... 71/27–30, 54–64.13
See application file for complete search history.

(56) References Cited

FOREIGN PATENT DOCUMENTS

| CN | 200710121488.3 | 9/2007 |
|---|---|---|
| CN | 101475407 A | 7/2009 |
| CN | 101624305 A | 1/2010 |
| CN | 101633588 A | 1/2010 |

OTHER PUBLICATIONS

"Urea", GB 2440-2001, from China General Administration of Quality Supervision, Inspection and Quarantine, published on Jul. 26, 2001.
"Fertilizer Making—Presentation and Declaration", GB 18382-2001, from China General Administration of Quality Supervision, Inspection and Quarantine, published on Jul. 26, 2001.
"Procedures for toxicological assessment of food", GB 15193.1-2003, from China General Administration of Quality Supervision, Inspection and Quarantine, published on May 1, 2004.
Chinese First Examination Report of corresponding China Application No. 201210232891.4, dated Jun. 30, 2014.

*Primary Examiner* — Jennifer A Smith
(74) *Attorney, Agent, or Firm* — J.C. Patents

(57) ABSTRACT

The present invention provides a boron-containing synergistic urea and preparation method and application thereof, the boron-containing synergistic urea is a product obtained by mixing, dehydrating and pelletizing a mixed aqueous solution of polyaspartic acid chelated potassium (also referred to as "polypeptide chelated potassium") and a borate amine salt together with molten urea, wherein the above three components are 0.04-0.12%, 0.08-0.24% and 99.64-99.88% by weight, respectively. The boron-containing synergistic urea provided by the present invention is obtained by effectively compositing polypeptide acid chelated potassium, borate amine salt and urea, which also can guarantee the application amount of effective boron, and meanwhile can help avoid excessive high local concentrations of boron, and achieve the purposes of prompting effective absorption of the plant to boron and of improving urea utilization rate.

12 Claims, No Drawings

BORON-CONTAINING SYNERGISTIC UREA AND PREPARATION METHOD AND APPLICATION THEREOF

CROSS-REFERENCE TO RELATED APPLICATIONS

This application claims priority to Chinese Patent Application 201210232891.4, filed on Jul. 5, 2012, entitled "Boron-containing Synergistic Urea and Preparation Method and Application Thereof", which is incorporated herein by reference in its entirety.

FIELD OF THE TECHNOLOGY

The present invention relates to boron-containing synergistic urea and preparation method thereof, and also provides an application of the boron-containing synergistic urea in boron-deficient soils and boron-sensitive crops planting and growth. The present invention belongs to the agricultural technology field.

BACKGROUND

Along with development of rural economy and improvement of the agricultural science and technology, the input of chemical fertilizers in agricultural production increases constantly. Among these fertilizers, nitrogenous fertilizer, especially urea is applied increasingly year by year, and urea has gained the well deserved title "dominant fertilizer", and is becoming one of the important factors affecting the food safety.

The increasing usage amount of urea also stimulates the pursuit of the production scale and yield of urea in the industry. China, for instance, has an annual output of urea of about 70 million tons, making up about 30% of the total output in the world, and the total production and consumption both firmly occupy the first place in the world. With the increasing of the production and application scale, another problem is that the nitrogen use efficiency is poor, or rather, the waste thereof is quite astonishing, it is manifested that the effective nitrogen in the applied urea fails to be absorbed and utilized effectively by the soils and the crops, and the usage effect can be achieved only by increasing the usage amount. Poor utilization rate of fertilizer not only results in a huge waste of energy and a heavy agricultural production burden, the abundant nitrogen loss in the applied urea can also easily cause nitrate nitrogen pollution to the underground water and create the greenhouse effect by the volatilization of nitrogen oxides. How to improve the utilization rate of nitrogen fertilizer especially urea in the agricultural production has become one of the important issues in the fields of agriculture, science and technology, and environmental protection etc. Besides the traditional means such as tillage measures and technique of fertilization, through which the utilization rate of urea could be improved, the research, development and promotion of novel urea products featured by long-term slow-release and high utilization rate have become the important innovative means, and gained widely attention.

From published research literature and patented technology, the means and relevant products for solving long-term slow-release effect of urea are mainly classified into four categories: (1) Products formed by adding in the urea a urease inhibitor for inhibiting urea ammonification or a nitrification inhibitor for inhibiting nitrification or nitrosification of ammonia; (2) coated urea formed by applying a coating to the surface of urea particles to form an insoluble coating structure, and to control the release of nitrogen through permeability of the coating, the common means are to utilize polymer coated urea particles and sulfur coated urea to regulate the release rate and release amount of nitrogen by changing the coating thickness; (3) manufacture of pure slow-release urea products of large particles; (4) synergistic urea products formed by adding polyaspartic acid (salt) with a nature of plant nutrient accelerator into the urea, which can inhibit rapid decomposition and loss of urea composition while accelerating crop absorption.

For the above illustrated urea provided in the prior art, the common point lies in the pursuit of slowing down the water dissolution rate of urea in the soil and achieving the purpose of slow release of urea, or slowing down decomposition of urea by means of urease inhibitor or a nitrification inhibitor.

The prior patent CN 200710121488.3 of the inventor of the present application, entitled "a plant nutrient absorption accelerator and preparation method and application thereof", discloses a polyaspartic acid chelated potassium (also referred to as "polypeptide chelated potassium"), as a plant nutrient absorption accelerator, it can enrich nutrients and intensify roots of the crop to enable the roots to have a stronger nutrient absorption capability and achieve the purpose of improving nitrogen use efficiency, such that crop can effectively absorb nutrients in a relatively low nutrient environment. The content of CN 200710121488.3 is herein incorporated by reference in its entirety. Based on this and in accordance with the balanced fertilization theory, the inventor proposed upon research that, trace elements can be further properly introduced to provide a synergistic urea containing certain trace element, which can effectively achieve and accelerate the absorption of plant to the nutrients and trace elements, and also help to improve urea use efficiency.

Different soil environment, different crops and different growth periods of the same crop have different demands on trace elements. Boron, one of the seven trace nutrients necessary for the growth and development of plants, mainly acts as a plant growth regulator to be applied to deal with boron deficiency symptom of plants, the influence of boron deficiency on plants is known. The main physiology function of boron in the process of growing a plant can be summarized as: to accelerate the operation of carbohydrates, accelerate a smooth and high quality pollination of plant, regulate the formation and operation of the organic acid in plant. The function of boron is also manifested in enhancing drought resistance and disease resistance and effect on accelerating ripening of crops.

There are two types of application methods of boron fertilizer: in one application method, the boron fertilizer is used as a base fertilizer with an application amount of 7.5-10 kg/ha, and in the other application method, the boron fertilizer is applied as a spray, in which the fertilizer is made into a 1-2% solution and applied once or twice prior to blossom or fruiting. The boron fertilizers currently used are mostly solid fertilizers, usually borax, which is an inorganic boron fertilizer and affected by the solubility. The main problems when applied directly are that, it is very difficult to uniformly disperse the boron fertilizer in the soil, and easy to cause excessive high local boron concentration in the soil, not only poisoning the crops, but also damaging soil quality due to boron residue. Consequently, the current research on boron fertilizer is mainly focused on improving the solubility of boron fertilizer in cold water and the boron content in the boron fertilizer, for example, a modified boron fertilizer by appropriate molecular modification has been provided. However, since the researched boron fertilizer is still mainly in the form of inorganic salts of boron, the aforementioned problems still exist. Therefore, for the applied boron fertilizers, how to ensure uniform boron dispersion, improve the use efficiency of boron element and achieve boron supplement and improve effective absorption capability of crops to boron element are also important issues in boron fertilizer application.

SUMMARY

The main problem solved by the present invention is to provide a boron-containing synergistic urea, such that boron element in a borate amine salt form can be uniformly distributed in the urea together with polyaspartic acid chelated potassium to obtain a novel synergistic urea. In the process of applying the synergistic urea, effective application amount of boron can be ensured and, meanwhile, excessive high local concentrations of boron fertilizer also can be avoided, such that effective absorption of nutrients by plants can be facilitated, and the urea use efficiency can be improved in various aspects.

The present invention also provides a preparation method of the boron-containing synergistic urea, such that polyaspartic acid chelated potassium and a borate amine salt can be uniformly composited with molten urea, making boron element stably present in the urea in an organic salt form and satisfying the relevant standards of urea and boron-containing urea.

In order to achieve the above object, one aspect of the present invention provides a boron-containing synergistic urea, the boron-containing synergistic urea is a product obtained by mixing and pelletizing a mixed aqueous solution of polyaspartic acid chelated potassium and a borate amine salt with molten urea, wherein the above three components: polyaspartic acid chelated potassium, the borate amine salt, and the molten urea are 0.04-0.12%, 0.08-0.24% and 99.64-99.88% by weight, respectively.

The boron-containing synergistic urea provided by embodiments of the present invention is actually a synergistic urea containing both macromolecule chelated potassium (referred to as "polypeptide chelated potassium" in the present invention) and a borate amine salt. Boron is introduced into the molten urea in the form of a stable organic amine salt, and has an excellent compatibility with the molten urea, not only staying stable in the urea, but also making boron element uniformly disperse in the urea. Boron element is supplied to the crop along with the application of urea, ensuring the effective application amount of boron and helping the crop to absorb boron and accelerate growth and development thereof, as well as preventing poisoning of crop and soil due to excessive high local concentration of boron fertilizer. In accordance with the balanced fertilization theory, applying boron element in a borate amine salt form together with the urea can benefit crops and accelerate the growth and development thereof and satisfy the effective demand for the growth and development of crops; applying boron element in an organic amine salt form together with the urea also can enhance nutrient absorption by the roots of the crop, in particular to nitrogen element absorption, and also has a positive effect on effectively utilizing nitrogen element in the urea.

The boron-containing urea in the present invention comprises polyaspartic acid chelated potassium as a plant nutrient absorption accelerator, it is an active component obtained by chelating polyaspartic acid and ecological organic acid with potassium salt through chemical reaction, upon application, it can chelate nutrients, delivery nutrients in the soil, and enrich nutrients around roots of the crop, also can enhance nutrient absorption by the roots of the crop to achieve the purpose of improving nitrogen use efficiency, and in particular, can have a significant effect on increasing nitrogen element absorption and utilization by the crop. In the invention patent CN 200710121488.3, entitled "a plant nutrient absorption accelerator and preparation method and application thereof" issued to the applicant of the present application, there are detailed descriptions on how to obtain polyaspartic acid chelated potassium (also referred to as "polypeptide chelated potassium") and relevant characteristics and application effects thereof, which patent is incorporated herein by reference in its entirety.

The synergistic urea provided by the present invention effectively composites a borate amine salt and a polypeptide chelated potassium, and then add them into molten urea to form a novel synergistic urea with significantly improved fertilizer efficiency. It can also be referred to as boron-containing polypeptide chelated potassium urea in the present invention.

On the other hand, the applicant has proved in practice that, compared to ordinary urea, the boron-containing synergistic urea of the present invention not only achieves uniform dispersion of boron element in urea carrier, which facilitates boron supplement and improves effective boron element absorption capability of crops, but also can improve urea use efficiency (in other words, to improve fertilizer efficiency of urea), the application amount of urea is reduced while achieving growth, which is more favorable to the soil protection. During application of urea, except very small portion of components are absorbed by the roots in the form of amide nitrogen, most of urea components are absorbed by the plant in the manner that, firstly it is decomposed into amide carbonate and ammonia ($H_2N$—$CO$—$NH_2$+$H_2O$→$H_2N$—$CO$—$OH$+$NH_3$), then amide carbonate is further decomposed into carbon dioxide and ammonia, during this process, since ammonia is volatile or oxidized to nitrate nitrogen in the form of $NO$ and $NO_2$ by nitrifying enzyme, thereby loss of nitrogen element can be caused, that also is one of the reasons why use efficiency of nitrogen element is poor during urea application. While the above effects obtained by applying the boron-containing synergistic urea of the present invention should benefit from the inhibition of borate amine salt dispersed in the urea to components such as urease and nitrifying enzyme to reduce loss of ammonia. The chelating property of organic carboxylic acid in polypeptide chelated potassium and the presence of borate amine salt also provide organic ammonium salt more apt to be absorbed by the plant, which is effective means to improve urea use efficiency.

According to the embodiments of the present invention, the borate amine salt added in the boron-containing synergistic urea can be a reaction product of a boric acid and an organic amine at 30-100° C., wherein the organic amine can be an alkylamine or an alkanolamine having a carbon chain length of no more than C4, for example, the combination of one or more small molecule organic amines such as ethanolamine, diethanolamine, triethanolamine, ethylenediamine, diethylene diamine and propylene diamine.

According to the embodiments of the present invention, the borate amine salt can be a reaction product of a boric acid and an organic amine at 30-100° C., and the molar ratio of the boric acid to the organic amine is 1:1-4:1.

According to the embodiments of the present invention, the polyaspartic acid chelated potassium is a reaction product of polysuccinimide, an organic acid and potassium hydroxide, the organic acid can be a dicarboxylic acid or a tricarboxylic acid chelatable with metal, and based on the weight of potassium salt, the weight ratio of the polyaspartic acid chelated potassium to the potassium salt of the organic acid in the reaction product is 1:1-5:1.

As described above, the polyaspartic acid chelated potassium in the present invention also can be referred to as polypeptide chelated potassium, and is already in use under a trade name of "polypeptide chelated potassium", the Chinese invention patent of 200710121488.3 issued to the applicant of the present application has described in details and experiments have proved that it is an effective plant nutrient accelerator, the contents of the patent of 200710121488.3 are incorporated herein by reference in its entirety.

The boron-containing synergistic urea of the present invention is obtained by mixing and pelletizing a mixed aqueous solution of polyaspartic acid chelated potassium and a borate amine salt with molten urea, in an embodiment, in the mixed aqueous solution of polyaspartic acid chelated potassium and the borate amine salt, polyaspartic acid chelated potassium and the borate amine salt, as active components, have a total mass content of 25-45%.

The present invention provides a urea with added trace element boron, that is, boron element is added in the product composition to become boron-containing urea, relevant management standards should be satisfied, including a national standard on urea of GB2440-2001, a national standard on fertilizer identification of GB2440-2001, and a standard ISO7409:1984 on requirements to urea products added the trace elements (the contents of trace elements should be more than 200 mg/kg).

The present invention also provides a preparation method of the boron-containing synergistic urea, wherein the preparation processes comprise: the mixed aqueous solution of polyaspartic acid chelated potassium and the borate amine salt is pumped into an evaporator by a constant delivery pump prior to a palletizing tower and mixed uniformly with molten urea, and then pelletized. In the manufactured boron-containing urea, the three components (polyaspartic acid chelated potassium, the borate amine salt, and the molten urea) are 0.04-0.12%, 0.08-0.24% and 99.64-99.88% by weight, respectively.

As explained above, the containing boron urea product provided in the present invention satisfies relevant management standards, and the boron content in the urea and uniform dispersion effect can be achieved by mixing the mixed aqueous solution of polyaspartic acid chelated potassium and the borate amine salt (the mixed aqueous solution containing active components) with the molten urea and then palletizing, such that boron element can be dispersed in the molten urea in the form of borate amine salt. Based on the content requirements on the three components (the polyaspartic acid chelated potassium, the borate amine salt, and the urea) in the containing boron urea product, adjust the contents of the polyaspartic acid chelated potassium and the borate amine salt (the content of active components) in the mixed aqueous solution of polyaspartic acid chelated potassium and the borate amine salt mixed in the molten urea to satisfy the addition amount of trace element boron in the urea. In an embodiment, the mixed aqueous solution of the polyaspartic acid chelated potassium and the borate amine salt is prepared such that the content of active components, i.e., the polyaspartic acid chelated potassium and the borate amine salt in the mixed aqueous solution is 25-45% by mass; the molten urea and the mixed aqueous solution are mixed uniformly by a mass proportion of 1000:4-1000:10 and then pelletized.

In an embodiment, the solution of polyaspartic acid chelated potassium and the solution of borate amine salt can be prepared respectively, and then further blended into a mixed aqueous solution containing active components, alternatively, the preparation of polyaspartic acid chelated potassium and the borate amine salt can be completed in sequence in a reaction system, to obtain the mixed aqueous solution containing active components.

In an embodiment, for example, it comprises the following processes of preparing a mixed aqueous solution of polyaspartic acid chelated potassium and a borate amine salt:

boric acid and an organic amine are reacted at 30-100° C. to prepare the aqueous solution of the borate amine salt, and the obtained borate amine salt has a content of 20-50% by mass in the aqueous solution;

the aqueous solution of the polyaspartic acid chelated potassium is prepared by polysuccinimide, an organic acid and potassium hydroxide as raw material, the polyaspartic acid chelated potassium has a content of 20-60% by mass in the aqueous solution, and based on the weight of the potassium salt, the weight ratio of the polyaspartic acid chelated potassium to the potassium salt of the organic acid in the reaction product is 1:1-5:1; the aqueous solution of polyaspartic acid chelated potassium and the aqueous solution of the borate amine salt are mixed by a ratio of 3:1-1:1 by weight to prepare the mixed aqueous solution.

Preparation also can be completed in the following processes:

the aqueous solution of the polyaspartic acid chelated potassium is prepared by polysuccinimide, an organic acid and potassium hydroxide as raw material, the polyaspartic acid chelated potassium has a content of 20-60% by mass in the aqueous solution, and based on the weight of the potassium salt, the weight ratio of the polyaspartic acid chelated potassium to the potassium salt of the organic acid in the reaction product is 1:1-5:1;

boric acid and an organic amine are added in the prepared aqueous solution of the polyaspartic acid chelated potassium, and continue to react at 30-100° C. to obtain the borate amine salt, such that the reaction system becomes the mixed aqueous solution of the polyaspartic acid chelated potassium and the borate amine salt;

or, boric acid and an organic amine as raw material are reacted at 30-100° C. to prepare the aqueous solution of the borate amine salt, and the obtained borate amine salt has a content of 20-50% by mass in the aqueous solution;

polysuccinimide, the organic acid and potassium hydroxide are further reacted in the prepared aqueous solution of the borate amine salt to obtain the polyaspartic acid chelated potassium, and based on the weight of the potassium salt, the weight ratio of the polyaspartic acid chelated potassium to the potassium salt of the organic acid in the reaction product is 1:1-5:1; such that the reaction system becomes a mixed aqueous solution of polyaspartic acid chelated potassium and a borate amine salt.

The preparation method of the present invention doesn't need any special equipment, but may adopt conventional urea production devices, such that the molten urea and the mixed aqueous solution containing active components can be uniformly mixed in a predetermined proportion and then pelletized, and the desired boron-containing urea is collected and obtained. The boron-containing synergistic urea (the boron-containing synergistic urea satisfies relevant standards of ordinary urea and urea with added trace element, and boron element content in the urea is greater than 200 mg/kg) is obtained after pelletizing.

To distinguish the white appearance of the ordinary urea, appropriate edible pigments (added in the mixed aqueous solution or molten urea in advance, or added in the mixing system simultaneously) can be added to make colored particle products.

The boron-containing synergistic urea provided in the present invention uses urea as a carrier, into which boron element in the form of borate amine salt is added; by means of the good intermiscibility of the two, boron fertilizer is dispersed uniformly, and the uniform distribution of boron fertilizer during urea application is good for absorption of boron by crops and soil, improving boron use efficiency and avoiding the adverse problems due to poor solubility of organic boron fertilizer; on the other hand, the presence of borate amine salt is good for inhibiting the decomposition of urease and nitrifying enzyme to urea, and improving urea use efficiency. To summarize, the boron-containing synergistic urea provided in the present invention comprises both borate amine salt and polyaspartic acid chelated potassium as active components and, when applied to the soil, it facilitates the function of enriching nutrients and enhancing nutrients absorption so as to maximize effect of urea while achieving boron supplement. The components combined with urea form a novel urea product, which improves fertilizer use efficiency, reduces loss, prevents pollution, and has significant economic, social and ecological benefits from aspects of accelerating enrichment, intensifying absorption, and balancing nutrients etc.

The present invention also provides an application of the above boron-containing synergistic urea in plant cultivation, including plants or crops sensitive to boron, such as various fruits and vegetables, fruit trees, and cotton crops, especially the application of boron fertilizers for oil crops of leguminous and cruciferous plants and for vegetables cultivation. The application amount of urea is reduced while achieving production growth of crops, which is good for protecting quality of the soil. The applicant's research also shows that, applying the boron-containing synergistic urea provided in the present invention can satisfy the safety and non-toxic requirement on crop and soil, and supplement boron during urea application, therefore, the boron-containing synergistic urea provided in the present invention is especially suitable for crops highly sensitive to boron and areas of boron-deficiency soil, and particularly used as base fertilizer and/or additional fertilizer (or topdressing) in combination with urea based on the soil and environment conditions.

Different types of crops have different demands on boron element, the more demands on boron, the more sensitive to boron, and application of boron-containing urea can achieve better fertilizer efficiency. Based on the sensitive degree of crop reacted to boron deficiency, the crop varieties sensitive to boron in common crops are illustrated below:

rape, cauliflower, celery, grape, radish, cabbage, lettuce, soybean, tomato, cotton, potato, carrot, peanut, Chinese chestnut, peach, tea, and etc.

The boron-containing synergistic urea with corresponding boron content is selected according to demands of crop and soil on boron supplement, or the application amount of urea is regulated.

To prove the applying effect of the boron-containing synergistic urea of the present invention, the applicant has made tests of fertilizer efficiency on the representative crops such as rape, soybean, celery, tomato, and carrot, and the results all show a significant yield increment and efficiency.

DETAILED DESCRIPTION

Hereinafter, the solutions and implementation effects of the present invention will be described in details with reference to embodiments and experiment examples, but the embodiments and experiment examples is not intended to limit the scope of the present invention.

Embodiment 1

Add 125 kg, 99% purity ethylene diamine into 360 kg water, then add 515 kg, 99% purity boric acid under constant stirring to obtain a reaction mixture solution, and here the molar ratio of the boric acid to the organic amine is 4:1. Heat the reaction mixture solution to a temperature of about 90° C., reaction is conducted at this temperature till the reaction mixture solution becomes transparent without boric acid particles present in the solution, and determine that the reaction is complete. At this stage, the boron content in the reaction product is 9% (by weight), and the borate amine salt content is 48.9% (by weight).

According to the method proposed in the prior patent CN 200710121488.3 which is herein incorporated by reference in its entirety, prepare 1000 kg, 28% aqueous solution of polyaspartic acid chelated potassium nutrient absorption accelerator (under a trade name of "polypeptide chelated potassium"):

At room or ambient temperature, add 140 kg polysuccinimide with a molecular weight greater than 5000 into 700 kg water, add 120 kg solid potassium hydroxide with purity greater than 90% while stirring, control reaction temperature during the process within about 75-80° C., till all the polysuccinimide is dissolved completely, then add 4.2 kg citric acid monohydrate while maintaining the reaction temperature, and at this point pH value of the system is substantially 7-8, after filtration, obtain 1000 kg brownish red transparent polyaspartic acid chelated potassium solution, wherein the content of the active component is 28%, and the weight ratio of the polyaspartic acid chelated potassium to the potassium citrate is 3.6:1.

Mix uniformly 500 kg aqueous solution of the above borate amine salt and 500 kg aqueous solution of nutrient absorption accelerator of the above polyaspartic acid chelated potassium to obtain 1000 kg mixed aqueous solution with active components, wherein the polyaspartic acid chelated potassium content is 14%, the borate amine salt content is 24.45%, the boron element content is 4.5%, and the total active component content is 38.45%.

Embodiment 2

Under a reaction temperature controlled at about 90° C., add 58.5 kg polysuccinimide with a molecular weight greater than 5000 into 561 kg water with violent stirring, and then add 50 kg potassium hydroxide to conduct reaction till the reaction mixture solution becomes a completely transparent state, then at this point add 17.5 kg citric acid monohydrate, and pH value of the reaction system is about 7, at this stage the weight ratio of the polyaspartic acid chelated potassium to the potassium citrate is 3.6:1, and an aqueous solution of polyaspartic acid chelated potassium is obtained.

Add 215 kg, 99% purity boric acid and 115 kg, 99% purity ethanolamine to the above aqueous solution of polyaspartic acid chelated potassium, stir violently till the reaction mixture solution becomes a full transparent state. During the whole reaction process, pH value is controlled at about 7, and at this point the molar ratio of the boric acid to the organic amine is 2:1.

Evaporate appropriately the above reaction solution to remove water, and eventually obtain 1000 kg mixed aqueous solution with active components, wherein the polyaspartic acid chelated potassium content is 11.7%, the borate amine salt content is 24%, the boron element content is 3.75%, and the total active component content is 35.7%.

Embodiment 3

Preparation of Boron-Containing Synergistic Urea

Take the mixed aqueous solutions prepared in Embodiment 1 and Embodiment 2 respectively to mix with molten urea in a predetermined proportion and then pelletize.

In particular, the mixed aqueous solution containing the active components is pumped into an evaporator by a metering pump prior to a pelletizing tower and mixed uniformly with the molten urea, and meanwhile appropriate amount of red edible pigment is added, trace amount of water is dehydrated, and then pelletizing is conducted to obtain the boron-containing synergistic urea.

Measure the relevant indices of the prepared synergistic urea containing boron, compared to GB2440-2001, and the measured results are as follows:

|  | Boron-containing synergistic urea (1) | Boron-containing synergistic urea (2) | GB2440-2001 |
|---|---|---|---|
| Ratio (mixed aqueous solution: molten urea, w/w) | 5:1000 (Embodiment 1) | 8:1000 (Embodiment 2) |  |
| Water (w %) | 0.36 | 0.48 | 0.5 |
| Biuret (w %) | 0.78 | 0.86 | 0.9 |
| Nitrogen Content (w %) | 46.4 | 46.4 | 46.3 |
| Color | Light Pink | Light Pink | White |
| Polyaspartic Acid Chelated Potassium (/kg product) | 700 mg/kg | 936 mg/kg |  |
| Organic Boron Content (/kg product) | 1200 mg/kg | 1923 mg/kg |  |
| Boron Content (/kg product) | 225 mg/kg | 300 mg/kg |  |

Conduct toxicity tests to the boron-containing synergistic urea prepared in Embodiment 3:

In accordance with "Procedures and Methods for Toxicological Evaluation on Food Safety" (GB15193.3-2003), it can be seen from toxicity tests that, oral acute toxicity in mice $LD_{50}$>20 g/Kg·BW (per kilogram of body weight), and the boron-containing synergistic urea of the present invention can be considered as non-toxic.

Application Test on Boron-Containing Synergistic Urea

Test One: Soybean Fertilizer Test

I. Basic Information

During the process of growth, the moisture and temperature are basically normal, which have no particular influence on the test. The basic information for the test plot is: mound albic soil, organic matter content 3.73%, and thickness of black soil layer is 18-20 cm, II. Materials and Methods 1. The tested fertilizer is the boron-containing synergistic urea developed and supplied by Beijing J-Tec Technology Co., Ltd. (the boron-containing synergistic urea (1) in Embodiment 3) while the control fertilizer is ordinary urea available in the market.

2. Field tests adopt plot test (the test plot is located in Haluo Town, Laiyang City, Shandong Province), three test areas are provided, each test area is divided into three treatment areas, each treatment area is 25.2 $m^2$, and the three test areas are tested in parallel.

3. Test Treatment

Apply base fertilizers uniformly in each test area and sow 4 rows in each treatment area, and subsequently apply additional fertilizers in the three treatment areas as below:

Treatment Area 1: additionally apply 5 kg boron-containing synergistic urea once per mu in the flowering and pod bearing period of the soybean;

Treatment Area 2: additionally apply 4 kg boron-containing synergistic urea once per mu in the flowering and pod bearing period of the soybean;

Treatment Area 3 (control area, ck): additionally apply 5 kg ordinary urea once per mu in the flowering and pod bearing period of the soybean as a control;

4. Adopt normal field management in the growth period of the soybean, harvest and monitor the yield in the mature period respectively, and take the average values of the corresponding treatment areas in the three test areas as the statistical results, see Table 1.

TABLE 1

| Treatment Area | Yield (Plant/$m^2$) | Plant Height (cm) | Pods per Plant (Pods/Plant) | Grains per Plant (Grains/Plant) | Unfilled Grains (Grains/Plant) | Grains Weight (g/Plant) | 100-Grain Weight (g) | Worm Eaten Rate (%) | Diseased Grain Rate (%) |
|---|---|---|---|---|---|---|---|---|---|
| 1 | 28.7 | 80.9 | 39.9 | 83.5 | 16.9 | 9.5 | 16.2 | 11.9 | 4.4 |
| 2 | 29.3 | 73.9 | 40.0 | 86.1 | 21.0 | 9.4 | 15.9 | 16.4 | 6.4 |
| 3 | 26.9 | 77.4 | 30.1 | 65.8 | 28.9 | 7.5 | 15.7 | 17.9 | 9.7 |

III. Results and Analysis

TABLE 2

| | Yield Analysis | | | | |
|---|---|---|---|---|---|
| Treatment Area | Theoretical Yield (kg/mu) | Practical Yield (kg/mu) | Yield Increment (kg/mu) | Yield Increment Rate (%) | Significance |
| 1 | 181.8 | 154.0 | 22.2 | 16.8 | ** |
| 2 | 183.6 | 146.8 | 15.0 | 11.4 | ** |
| 3 | 134.5 | 131.8 | | | |

Note:
**: $p < 0.01$, the difference is significant;
"Yield increment" is the difference between the practical yields in treatment areas 1 and 2 and treatment area 3 (ck).

Seen from the above results, the pods per plant, grains per plant, grains weight, 100-grain weight of the soybean in the two test groups are all greater than those of the control groups, while unfilled grains, worm eaten rate and infected grain rate are all less than those of the control groups, and the yields are both higher than that of the control groups, the average yield increment is 15-22.2 kg/mu, and the yield increment rate is 11.4-16.8%, it indicates that the boron-containing synergistic urea of the present invention has a good yield increment, resistance to pests and diseases on the growth of soybean. Even though fertilizer is reduced by 20% (treatment area 2), the yield still increases by 11.4%.

Test Two: Rape Fertilizer Test

I. Materials and Methods

1. Test Material: The tested fertilizer is the boron-containing synergistic urea developed and supplied by Beijing J-Tec Technology Co., Ltd. (the boron-containing synergistic urea (1) in Embodiment 3) while the control fertilizer is ordinary urea available in the market.

2. Test Site:

Nanyang site: Yuanxiang Village, Nanyang Town, Qidong City of Jiangsu Province, an area of 4 mu, rape variety is "Shi Li Jia 史力佳)".

Lvsi site: Nanxinqiao Village, Sigang Town, Qidong City, an area of 5 mu.

3. Test Method: the boron-containing synergistic urea is used as a topdressing fertilizer (additional fertilizer), 20 kg per mu; while the control field adopts ordinary urea (commercially available), 20 kg per mu.

4. Assessment Content: prior to harvest, field assessments such as density, plant height, effective branch, yield structure are conducted; after harvest, recount the actual yield, and the results are shown in Table 3.

II. Results and Analysis than that of the control group; 319.2 kg yield, 56.5 kg more than that of the control group, increased by 21.5%. Calculated with an average price of 4 RMB/kg in the rape seed market in recent years, the production value per mu is increased by RMB 226, the application amount of the boron-containing synergistic urea per mu is 20 kg, about RMB 143.5 higher in cost than the ordinary urea, the benefit increment per mu is about RMB 212, and the input-output ratio is about 1:15.7.

Test Three: Celery Fertilizer Test

I. Materials and Methods

1. Test material: The tested fertilizer is the boron-containing synergistic urea developed and supplied by Beijing J-Tec Technology Co., Ltd. (the boron-containing synergistic urea (1) in Embodiment 3) while the control fertilizer is ordinary small granular urea and large granular urea in line with national standards: the tested vegetable is celery.

2. Test Site:

Area under jurisdiction of Laiyang City, Shandong Province

3. Test Method: equivalent fertilizer test area and decrement fertilizer test area are arranged, two treatment areas are provided in each test area, and each treatment area is arranged repeatedly for 3 times, ranked in random area and group.

TABLE 3

| | Item | Density (plant) | Plant Height (cm) | Effective Branch (each) | pods per plant (pod) | Grains per pod (grain) | 1000-Grain Weight (g) | Yield (kg/mu) | Yield Increment Rate (%) |
|---|---|---|---|---|---|---|---|---|---|
| Nanyang site | boron-containing synergistic urea | 5550 | 208 | 31 | 685 | 19.2 | 4.5 | 328.5 | 21.9 |
| | Ordinary Urea | 5550 | 196 | 28 | 568 | 19 | 4.5 | 269.5 | |
| Lvsi site | boron-containing synergistic urea | 5550 | 205 | 30 | 697 | 21.3 | 3.7 | 304.9 | 21.1 |
| | Ordinary Urea | 5550 | 185 | 26 | 598 | 20.5 | 3.7 | 251.7 | |
| Average | boron-containing synergistic urea | 5550 | 206.5 | 30.5 | 691 | 20.3 | 4.1 | 319.2 | 21.5 |
| | Ordinary Urea | 5550 | 190.5 | 27 | 583 | 19.8 | 4.1 | 262.7 | |

Note:
Table 3 is the assessment result two months after fertilizer application in each test site;
"Average" is the average value of the corresponding assessment results in two test sits;
"Yield increment rate" is the yield increment rate of each statistical item after applying the boron-containing synergistic urea, compared to the case of applying ordinary urea.

After the boron-containing synergistic urea of the present invention is applied as a topdressing fertilizer for the rape, during the flowering and pod bearing period, it can be observed that the rape has a more vigorous growing potential, darker leaf color, more branches, higher pod bearing rate, and less mal-pods. In accordance with field investigation and yield monitoring result two months after fertilizer application recorded in Table 3, under the same application amount of the fertilizer, the average plant height of rape applied with the boron-containing synergistic urea is 206.5 cm, 16 cm higher than that of the control group; 30.5 effective branches, increasing 3.5 branches than that of the control group; 691 pod per plant, increasing 108 pods than that of the control group; 20.3 grains (average) per pod, increasing 0.5 grains Equivalent Fertilizer Test Area Treatment Area 1: the boron-containing synergistic urea is applied, calculated by 70 kg per mu, and flushed together with water after emergence of seedlings;

Treatment Area 2: ordinary small granular urea (as a control area, ck), calculated by 70 kg per mu, and flushed together with water after emergence of seedlings.

Decrement Fertilizer Test Area:

Treatment Area 1: the boron-containing synergistic urea is applied with a decrement of 20%, calculated by 56 kg per mu, base fertilizer and additional fertilizer each makes up 50%;

Treatment Area 2: ordinary large granular urea, calculated by 70 kg per mu, base fertilizer and additional fertilizer each makes up 50%.

4. Test Requirement: The celery in each treatment area is harvested, weighed, and calculated separately during each collection and harvest. No other fertilizer is applied during the whole test period, and other cultivation and management measures are the same.

II. Results and Analysis

1. Equivalent Fertilizer Test

One week after applying fertilizer, it can be observed that the celery in the test area applied with the boron-containing synergistic urea has a vigorous growth potential, which is obviously superior to that in the control area applied with ordinary small granular urea.

52 days after applying fertilizer, select randomly three plots respectively from the test areas and control areas, all are 1 m long and 1.45 m wide, and the harvested celery is weighed on site, and results are as follows:

TABLE 4

Celery Yield Comparison in Equivalent Fertilizer Test

| Plot | Test area with the boron-containing synergistic urea (Treatment 1)(kg) | Control Area (Treatment 2)(kg) | Yield Increment (kg) | Yield Increment Rate (%) |
|---|---|---|---|---|
| 1st plot | 10.0 | 6.6 | 3.4 | — |
| 2nd plot | 9.1 | 7.5 | 1.6 | — |
| 3rd plot | 8.7 | 8.15 | 0.55 | — |
| In total | 27.8 | 22.25 | 5.55 | 24.9 |

The total yield in the test areas is reflected by the three plots that, and it can be seen that, compared to that applied with ordinary small granular urea, equivalent application of the boron-containing synergistic urea can increase the yield of celery by 24.9%.

2. Decrement Fertilizer Test Area 30 days after sowing, the celery with the boron-containing synergistic urea has a darker and thicker leaves, while that with ordinary large granular urea has green and thin leaves.

Select randomly three plots respectively from the test areas and control areas, all are 1 m long and 1.45 m wide, and the harvested celery is weighed on site, and results are as follows:

TABLE 5

Celery Yield Comparison in 20% Decrement Fertilizer Test

| Plot | Test area with the boron-containing synergistic urea (Treatment 1)(kg) | Control Area (Treatment 2)(kg) | Yield Increment (kg) | Yield Increment Rate (%) |
|---|---|---|---|---|
| 1st plot | 7.0 | 6.8 | 0.2 | — |
| 2nd plot | 6.3 | 6.0 | 0.3 | — |
| 3rd plot | 6.3 | 5.7 | 0.6 | — |
| In total | 19.5 | 18.5 | 1.0 | 5.4 |

In cultivation of celery, compared with the case of applying abundant large granular urea, applying the boron-containing synergistic urea with a decrement of 20% still increases the yield of celery by 5.4%.

III. Conclusion

1. The boron-containing synergistic urea of the present invention can promote the growth and development of celery if applied in cultivation of celery;

2. Even in the case of applying with a decrement of 20% compared to ordinary urea, the boron-containing synergistic urea of the present invention still shows a production increasing effect, improves the input-output ratio, and increases economic benefit.

3. It can be observed through the tests, the boron-containing synergistic urea has no adverse effect on the normal growth of celery.

Test Four: Tomato Fertilizer Test

I. Basic Information

Test Site Laiyang: City, Shandong Province.

The basic information for the test plot is: meadow cinnamon soil, organic matter content is 13.44 g/kg, available nitrogen content is 96.72 mg/kg, available phosphorus content is 19.08 mg/kg, and available potassium content is 116 mg/kg.

Grow seedling in greenhouse at Feb. 24, 2011, and plant in the greenhouse with a tomato plantation density of 4200 plant/mu.

II. Materials and Methods

1. The tested fertilizer is the boron-containing synergistic urea developed and supplied by Beijing J-Tec Technology Co., Ltd. (the boron-containing synergistic urea (1) in Embodiment 3, under a trade name of "polypeptide chelated potassium") while the control fertilizer is ordinary small granular urea and large granular urea in line with national standards; the tested vegetable is tomato (variety of "Millennium", 千禧).

2. Test Method: equivalent fertilizer test area and decrement fertilizer test area are arranged, two treatment areas are provided in each test area, and each treatment area is arranged repeatedly for 3 times, ranked in random area and group, each treatment area has an area of 20 m² (5 m long, 4 m wide).

Equivalent Fertilizer Test Area

Treatment Area 1: the boron-containing synergistic urea is applied, calculated by 70 kg per mu, and flushed together with water after emergence of seedlings;

Treatment Area 2: ordinary small granular urea (as a control area, ck), calculated by 70 kg per mu, and flushed together with water after emergence of seedlings.

Decrement Fertilizer Test Area:

Treatment Area 1: the boron-containing synergistic urea is applied with a decrement of 20%, calculated by 56 kg per mu, base fertilizer and additional fertilizer each makes up 50%;

Treatment Area 2: ordinary large granular urea (as a control area, ck), calculated by 70 kg per mu, base fertilizer and additional fertilizer each makes up 50%.

3. Test Requirement: The tomato in each treatment area is harvested, weighed, and calculated separately during each collection and harvest. No other fertilizer is applied during the whole test period, and other cultivation and management measures are the same.

III. Results and Analysis

1. Tomato Growing Potential and Disease Resistance

Tomato in the test area applied with the boron-containing synergistic urea has a vigorous growth potential, a dark leaf color, a large functional leaf area and a stout plant, which are obviously superior to those applied with ordinary urea (control area, ck), and it has proved that the application of the boron-containing synergistic urea has an effect of strong sprout;

As for tomato plant in the test area applied with the boron-containing synergistic urea, the incidence of bacterial wilt is 0.69%, which is obviously superior to that applied with ordinary urea (control area, ck) of 4.54%, and it has proved that the application of the boron-containing synergistic urea has an obvious bacteria inhibition on tomato.

2. Equivalent Fertilizer Test and Decrement Fertilizer Test

Select one plot (12 plots in total, indicated as $1^{st}$ plot, $2^{nd}$ plot and $3^{rd}$ plot corresponding to each test) randomly from each treatment area 1 and treatment area 2 (control area) respectively, all are 1 m long, 1.45 m wide, and the harvested tomato is weighed on site, and results are as follows:

TABLE 6

Tomato Yield Comparison in Equivalent Fertilizer Test and Decrement Fertilizer Test

| Treatment | $1^{st}$ plot (kg) | $2^{nd}$ plot (kg) | $3^{rd}$ plot (kg) | Average Yield among three plots (kg) | Average Yield per mu (kg) | Yield Increment (kg) | Yield Increment Rate (%) |
|---|---|---|---|---|---|---|---|
| Equivalent Fertilizer Test | 131.2 | 129.7 | 135.5 | 132.1 | 4420.0 | 523.3 | 13.5 |
| Control Test | 111.6 | 113.8 | 118.0 | 114.5 | 3863.3 | — | — |
| Decrement Fertilizer Test | 130.8 | 126.3 | 132.6 | 129.9 | 4316.7 | 420 | 10.8 |
| Control Test | 114.3 | 118.1 | 115.6 | 116.0 | 3896.7 | — | — |

Seen from Table 6, Equivalent fertilizer test has a maximum average yield per mu of 4420.0 kg, while decrement fertilizer test has a second largest average yield per mu of 4316.7 kg, compared to that applied with ordinary small granular urea, equivalent application of the boron-containing synergistic urea can increase the yield of tomato by 523.3 kg, 13.5%; compared to that applied with ordinary large granular urea, equivalent application of the boron-containing synergistic urea can increase the yield of tomato by 420 kg, 10.8%.

IV. Conclusion

1. The boron-containing synergistic urea of the present invention can promote the yield of tomato obviously, and the average yield increment rate is within 10.8-13.5%;

2. Even in the case of applying with a decrement of 20% compared to ordinary urea, the boron-containing synergistic urea of the present invention still shows a production increasing effect, improves the input-output ratio, and increases economic benefit.

3. The boron-containing synergistic urea of the present invention can promote the disease resistance of crops, and have a good application prospect on pollution-free vegetables.

4. The application of the boron-containing synergistic urea of the present invention can improve nutrition use efficiency, reduce the application amount of the fertilizer and thus reduce the influence and damage on the ecological environment due to application of the fertilizer.

Test Five: Apple Tree Fertilizer Test

I. Materials and Methods

1. Test Fertilizer: the tested fertilizer is the boron-containing synergistic urea developed and supplied by Beijing J-Tec Technology Co., Ltd. (the boron-containing synergistic urea (1) in Embodiment 3) while the control fertilizer is ordinary small granular urea and large granular urea in line with national standards the tested fruit tree is apple tree (variety of "Red Fuji apple", 红富士).

2. Test Site: Laiyang City, Shandong Province,

3. Tested Variety: apple tree of four years old, variety is Red Fuji apple, planting space is 2 m×3 m, plants with moderate growth, similar tree vigor, and substantially consistent yield, and conventional orchard management is conducted before the test.

4. Test Method: equivalent fertilizer test area and decrement fertilizer test area are arranged, two treatment areas are provided in each test area, 3 tested plants are included in each treatment area and each treatment area is arranged repeatedly for 3 times, ranked in random area and group;

The fertilizer is applied in small holes near the plants, and the fertilizing periods are fertilizer application after leaves falling in autumn and additional fertilizer application during fruit expanding period (July and August).

Equivalent Fertilizer Test Area

Treatment Area 1: the boron-containing synergistic urea is applied, calculated by 70 kg per mu, and flushed together with water;

Treatment Area 2: ordinary small granular urea (as a control area, ck), calculated by 70 kg per mu, and flushed together with water.

Decrement Fertilizer Test Area:

Treatment Area 1: the boron-containing synergistic urea is applied with a decrement of 20%, calculated by 56 kg per mu, base fertilizer and additional fertilizer each makes up 50%;

Treatment Area 2: ordinary large granular urea (as a control area, ck), calculated by 70 kg per mu, base fertilizer and additional fertilizer each makes up 50%.

5. Test Method:

Make statistical analysis to flowering numbers and petal numbers in each flower during full-blossom period in spring, and make statistical analysis to fruit setting percentage after full-blossom period and before flower thinning.

Measure and record once a month after growth of new shoots;

Pick 30 fruits randomly from different portions after fruit ripening, and weigh the single fruit with an electronic balance scale, measure the longitudinal diameter and the transverse diameter with a vernier caliper; observe the fruit surface and the coloring of the fruit; determine the hardness of fruit with a hardometer.

II. Results and Analysis

1. Effect on the growth of fruit tree after applying the boron-containing synergistic urea 1.1 Effect on the new shoots of fruit tree after applying the boron-containing synergistic urea The growth of new shoots occurs at the early stage of fruit growth, which is very important to rapidly form leaves and increase tree nutrition, and capable of promoting the growth and development of fruit in the current year. Seen from Table 7, application of the boron-containing synergistic urea has an obvious promoting function on the growth of new shoots, the fruit tree in equivalent fertilizer test area has the maximum increment of new shoots, that is, 50.91 cm, increasing by 47.56% compared to that in control test area; the fruit tree in decrement fertilizer test area also has an increment of new shoots of 41.71 cm, increasing by 20.90% compared to that in control test area.

1.2 Effect on the leaf thickness and leaf weight of fruit tree after applying the boron-containing synergistic urea Seen from Table 7, application of the boron-containing synergistic urea has an obvious effect on leaf weight and leaf thickness. Wherein, it is most significant in equivalent fertilizer test, which indicates that application of the boron-containing synergistic urea can obviously change the leaf quality and make the leaf thicker and heavier.

TABLE 7

Effecton the Growth of Fruit Tree in Equivalent Fertilizer and Decrement Fertilizer

| | Item | | |
|---|---|---|---|
| Treatment | Increment of New Shoots (cm) | Leaf Weight (g) | Leaf Thickness (g) |
| Equivalent Fertilizer Test Area | 50.91 | 85.53 | 24.14 |
| Decrement Fertilizer Test Area | 41.71 | 85.08 | 23.77 |
| Control Test Area | 34.50 | 79.74 | 20.55 |

2. Effect on the yield of fruit tree after applying the boron-containing synergistic urea The fruit setting percentage and single fruit weight have an important effect on the yield of fruit tree, seen from Table 8, the fruit tree applied with the boron-containing synergistic urea has an improved fruit setting percentage to some extent compared with the control test, wherein, equivalent fertilizer test has an optimal fruit setting percentage, that is 86%, which is 15.28% higher than that in the control test area, and the second is the fruit setting percentage of decrement fertilizer test, which is 14.21% higher than that in the control test area.

TABLE 8

Effect on Yield of Apple in Equivalent Fertilizer and Decrement Fertilizer

| | Treatment | | |
|---|---|---|---|
| Item | Equivalent Fertilizer Test Area | Decrement Fertilizer Test Area | Control Test Area |
| Fruit Setting Percentage (%) | 86 | 85.2 | 74.6 |
| Single Fruit Weight (g) | 233.2 | 222.0 | 202.1 |

III. Conclusion

1. The boron-containing synergistic urea in the present invention can promote the growth and development of new shoots of the fruit tree, significantly improve the leaf weight and leaf thickness, facilitate the photosynthesis and lay good foundation for yield increment;

2. Application of the boron-containing synergistic urea in the present invention can improve the fruit setting percentage, increase single fruit weight, and the single fruit weight in equivalent fertilizer test is increased by 31.1 g and 15.38%, compared with that in the control test;

3. Application of the boron-containing synergistic urea in the present invention can make the fruit and fruit surface clean, thus significantly improve the appearance quality of the fruit.

4. Application of the boron-containing synergistic urea in the present invention can improve the hardness of fruit and improve the inner quality of the fruit.

What is claimed is:

1. A boron-containing synergistic urea, the boron-containing synergistic urea is a product obtained by mixing a mixed aqueous solution of polyaspartic acid chelated potassium and a borate amine salt with molten urea and pelletizing, wherein the percentage of the polyaspartic acid chelated potassium, the borate amine salt, and the molten urea is 0.04-0.12%, 0.08-0.24% and 99.64-99.88% (by weight), respectively.

2. The boron-containing synergistic urea according to claim 1, wherein the borate amine salt is a reaction product of a boric acid and an organic amine at 30-100° C., and the organic amine comprises an alkylamine or an alkanolamine having a carbon chain length of no more than C4.

3. The boron-containing synergistic urea according to claim 2, wherein the borate amine salt is a reaction product of the boric acid and the organic amine at 30-100° C., and the molar ratio of the boric acid to the organic amine is 1:1-4:1.

4. The boron-containing synergistic urea according to claim 1, wherein the polyaspartic acid chelated potassium is a reaction product of polysuccinimide, organic acid and potassium hydroxide, the organic acid is a dicarboxylic acid or a tricarboxylic acid chelatable with metal, and measured based on the weight of potassium salt, the weight ratio of the polyaspartic acid chelated potassium to the potassium salt of the organic acid in the reaction product is 1:1-5:1.

5. The boron-containing synergistic urea according to claim 1, wherein in the mixed aqueous solution of the polyaspartic acid chelated potassium and the borate amine salt, the polyaspartic acid chelated potassium and the borate amine salt, as active components, have a total mass content of 25-45%.

6. The boron-containing synergistic urea according to claim 2, wherein in the mixed aqueous solution of the polyaspartic acid chelated potassium and the borate amine salt, the polyaspartic acid chelated potassium and the borate amine salt, as active components, have a total mass content of 25-45%.

7. The boron-containing synergistic urea according to claim 3, wherein in the mixed aqueous solution of the polyaspartic acid chelated potassium and the borate amine salt, the polyaspartic acid chelated potassium and the borate amine salt, as active components, have a total mass content of 25-45%.

8. A preparation method of the boron-containing synergistic urea, the boron-containing synergistic urea is a product obtained by mixing a mixed aqueous solution of polyaspartic acid chelated potassium and a borate amine salt with molten urea and pelletizing, wherein the percentage of the polyaspartic acid chelated potassium, the borate amine salt, and the molten urea is 0.04-0.12%, 0.08-0.24% and 99.64-99.88% (by weight), respectively; and the preparation method comprises the following processes:

pumping the mixed aqueous solution of the polyaspartic acid chelated potassium and the borate amine salt into an evaporator prior to a palletizing tower and mixing uniformly the mixed aqueous solution of the polyaspartic acid chelated potassium and the borate amine salt with the molten urea, and then pelletizing.

9. The preparation method according to claim 8, comprising: preparing the mixed aqueous solution of polyaspartic acid chelated potassium and the borate amine salt such that in the mixed aqueous solution, the polyaspartic acid chelated potassium and the borate amine salt, as active components, have a total content of 25-45% by weight; and mixing the molten urea uniformly with the mixed aqueous solution by a proportion of 1000:4-1000:10 and then pelletizing.

10. The preparation method according to claim 9, comprising the following processes of preparing the mixed aqueous solution of the polyaspartic acid chelated potassium and the borate amine salt:
    conducting reaction between boric acid and an organic amine at 30-100° C. to prepare an aqueous solution of the borate amine salt, and the obtained borate amine salt has a content of 20-50% by weight in the aqueous solution; and the organic amine comprises an alkylamine or an alkanolamine having a carbon chain length of no more than C4;
    preparing an aqueous solution of the polyaspartic acid chelated potassium by using polysuccinimide, an organic acid and potassium hydroxide as raw material, the polyaspartic acid chelated potassium has a content of 20-60% by weight in the aqueous solution, and measured based on the weight of potassium salt, the weight ratio of the polyaspartic acid chelated potassium to the potassium salt of the organic acid in the reaction product is 1:1-5:1;
    mixing the aqueous solution of the polyaspartic acid chelated potassium and the aqueous solution of the borate amine salt by a ratio of 3:1-1:1 by weight to prepare the mixed aqueous solution.

11. The preparation method according to claim 9, comprising the following processes of preparing the mixed aqueous solution of the polyaspartic acid chelated potassium and the borate amine salt:
    preparing the aqueous solution of the polyaspartic acid chelated potassium by using polysuccinimide, an organic acid and potassium hydroxide as raw material, the polyaspartic acid chelated potassium has a content of 20-60% by weight in the aqueous solution, and measured based on the weight of potassium salt, the weight ratio of the polyaspartic acid chelated potassium to the potassium salt of the organic acid in the reaction product is 1:1-5:1;
    adding boric acid and an organic amine in the prepared aqueous solution of the polyaspartic acid chelated potassium, and continue to react at 30-100° C. to obtain the borate amine salt, such that reaction system becomes the mixed aqueous solution of the polyaspartic acid chelated potassium and the borate amine salt; and the organic amine comprises an alkylamine or an alkanolamine having a carbon chain length of no more than C4;
or,
    using boric acid and an organic amine as raw material to react at 30-100° C. to prepare the aqueous solution of the borate amine salt, and the obtained borate amine salt has a content of 20-50% by weight in the aqueous solution; and the organic amine comprises an alkylamine or an alkanolamine having a carbon chain length of no more than C4;
    conducting reaction between polysuccinimide, the organic acid and potassium hydroxide in the prepared aqueous solution of the borate amine salt to obtain the polyaspartic acid chelated potassium, and measured based on the weight of potassium salt, the weight ratio of the polyaspartic acid chelated potassium to the potassium salt of the organic acid in the reaction product is 1:1-5:1; such that reaction system becomes the mixed aqueous solution of the polyaspartic acid chelated potassium and the borate amine salt.

12. An application of the boron-containing synergistic urea, the boron-containing synergistic urea is a product obtained by mixing a mixed aqueous solution of polyaspartic acid chelated potassium and a borate amine salt with molten urea and pelletizing, wherein the percentage of the polyaspartic acid chelated potassium, the borate amine salt, and the molten urea is 0.04-0.12%, 0.08-0.24% and 99.64-99.88% (by weight), respectively.

* * * * *